United States Patent
Won et al.

(10) Patent No.: US 12,491,807 B2
(45) Date of Patent: Dec. 9, 2025

(54) VEHICLE HEADREST DEVICE

(71) Applicants: Hyundai Motor Company, Seoul (KR); Kia Corporation, Seoul (KR); Hyundai Transys Inc., Seosan-si (KR); Woobo Tech Co., Ltd., Pyeongtaek-si (KR)

(72) Inventors: Tae Hee Won, Uiwang-si (KR); Jun Ho Lee, Yongin-si (KR); Hae Il Jeong, Incheon (KR); Hyun Kim, Hwaseong-si (KR)

(73) Assignees: HYUNDAI MOTOR COMPANY, Seoul (KR); KIA CORPORATION, Seoul (KR); HYUNDAI TRANSYS INC., Seosan-si (KR)

( * ) Notice: Subject to any disclaimer, the term of this patent is extended or adjusted under 35 U.S.C. 154(b) by 315 days.

(21) Appl. No.: 18/316,394

(22) Filed: May 12, 2023

(65) Prior Publication Data

US 2024/0149772 A1 May 9, 2024

(30) Foreign Application Priority Data

Nov. 7, 2022 (KR) .................. 10-2022-0147001

(51) Int. Cl.
*B60N 2/829* (2018.01)
(52) U.S. Cl.
CPC .................. *B60N 2/829* (2018.02)
(58) Field of Classification Search
CPC ................ B60N 2/829; B60N 2/865
See application file for complete search history.

(56) References Cited

U.S. PATENT DOCUMENTS

| | | | |
|---|---|---|---|
| 8,348,338 B2 * | 1/2013 | Galecka | B60N 2/809 297/216.12 |
| 10,414,312 B2 * | 9/2019 | Fredriksson | B60N 2/829 |
| 10,500,997 B2 * | 12/2019 | Maloney | B60N 2/829 |
| 10,960,802 B2 * | 3/2021 | Kotz | B60N 2/853 |
| 2007/0135982 A1 | 6/2007 | Breed et al. | |
| 2013/0116893 A1 | 5/2013 | Yamaguchi et al. | |
| 2016/0129816 A1 * | 5/2016 | Lee | B60N 2/853 297/409 |
| 2019/0160985 A1 | 5/2019 | Yu et al. | |
| 2019/0168649 A1 | 6/2019 | Watson | |
| 2020/0247276 A1 * | 8/2020 | Little | B60N 2/829 |

FOREIGN PATENT DOCUMENTS

| | | |
|---|---|---|
| JP | 6476469 B2 | 4/2014 |
| KR | 19980018096 U | 7/1998 |
| KR | 20000006321 U | 4/2000 |
| KR | 20070117966 A | 12/2007 |

* cited by examiner

*Primary Examiner* — Philip F Gabler
(74) *Attorney, Agent, or Firm* — SLATER MATSIL, LLP

(57) ABSTRACT

An embodiment vehicle headrest device includes a headrest including a pad portion configured to contact and support a sitting passenger's head and a cover portion positioned behind the pad portion, the pad portion being configured to move diagonally, a main frame coupled to a headrest stay and configured to move upwards/downwards along the headrest stay, and a motor module portion connected to the pad portion and the main frame such that, in operation, the motor module portion is configured to move an entirety of the headrest, including the main frame, upwards/downwards or to move only the pad portion diagonally.

20 Claims, 12 Drawing Sheets

VEHICLE HEADREST DEVICE

CROSS-REFERENCE TO RELATED APPLICATIONS

This application claims the benefit of Korean Patent Application No. 10-2022-0147001, filed on Nov. 7, 2022, which application is hereby incorporated herein by reference.

TECHNICAL FIELD

The present disclosure relates to a vehicle headrest device.

BACKGROUND

A vehicle seat includes a seat cushion for supporting the lower body of a sitting passenger, a seat back for supporting the passenger's upper body, and a headrest for supporting the passenger's head.

The headrest needs to be configured such that the passenger can rest in a comfortable and relaxed manner, and, particularly, needs to be able to prevent injury to the passenger's neck in the case of an accident.

Conventional headrests can only move upwards/downwards and forwards/downwards, and such a structure has a problem in that, if the head support position is changed depending on the passenger's body type, such a change cannot be dealt with effectively.

For example, if the sitting passenger reclines the seat back to rest in a relax mode, the headrest moves away from the passenger's head because the center of rotation of the seat back is different from that of the sitting passenger. In such a case, conventional headrests that can only move upwards/downwards and forwards/downwards cannot support the passenger's head in the accurate position. This poses a problem in that the passenger feels discomfort, and neck injury is worsened in the case of an accident.

The above descriptions regarding background technologies have been made only to help understanding of the background of embodiments of the present disclosure, and are not to be deemed by those skilled in the art to correspond to already known prior art.

SUMMARY

The present disclosure relates to a vehicle headrest device. Particular embodiments relate to a vehicle headrest device having a pad portion capable of moving upwards/downwards and diagonally while contacting the head of a sitting passenger such that the passenger can ride in the vehicle more comfortably.

An embodiment of the present disclosure provides a vehicle headrest device having a pad portion capable of moving upwards/downwards and diagonally while contacting the head of a sitting passenger such that, even when the support position is changed by a rotation of the seat back and depending on the passenger's body shape, the head can be supported in the accurate position, thereby ensuring that the passenger can ride in the vehicle more comfortably, and neck injury is alleviated in the case of an accident.

In accordance with an embodiment of the present disclosure, a vehicle headrest device may include a headrest including a pad portion configured to contact and support a sitting passenger's head and a cover portion positioned behind the pad portion, the pad portion being configured to move diagonally, a main frame coupled to a headrest stay and configured to move upwards/downwards along the headrest stay, and a motor module portion connected to the pad portion and the main frame such that, when operating, the motor module portion moves the entire headrest, including the main frame, upwards/downwards or moves only the pad portion diagonally.

The pad portion may be configured to move in a diagonal direction which is an inclined direction from an upper rear side to a lower front side.

The cover portion may be coupled to the main frame while surrounding the main frame and the motor module portion.

The headrest stay may be fixedly installed so as to penetrate a stay guide coupled to an upper end of a seat back.

A wire may be installed via an inner space of the headrest stay so as to supply electric power to the motor module portion.

The motor module portion may include an up/down driving module configured such that, when operating, the up/down driving module moves the entire headrest, including the main frame, upwards/downwards. The up/down driving module may include an up/down motor fixedly installed on a module base connected to the main frame, an up/down lead screw configured to rotate when the up/down motor operates, and an up/down carrier having one end penetrated by the up/down lead screw through screw coupling, the other end of the up/down carrier being fixedly coupled to the headrest stay through the main frame.

When the up/down lead screw is rotated by an operation of the up/down motor, the up/down lead screw may move upwards/downwards through the up/down carrier via the headrest stay and the up/down carrier, which are fixed, when the up/down lead screw moves, the up/down motor and the main frame connected through the module base may move along the headrest stay in the same upward/downward direction, and when the main frame moves, the headrest connected to the motor module portion may move in the same upward/downward direction.

The main frame may have a carrier hole formed to be penetrated by the up/down carrier, and the carrier hole may be formed to extend upwards/downwards such that, when the main frame moves upwards/downwards, interference between the main frame and the up/down carrier is avoided.

The up/down driving module may further include multiple up/down guides disposed parallel to the up/down lead screw, one end of each up/down guide being fixed to the module base, and the other end thereof being installed to penetrate the up/down carrier.

The motor module portion may include a relax driving module configured such that, when operating, the relax driving module moves the pad portion of the headrest diagonally. The relax driving module may include a relax motor fixedly installed on a module base connected to the main frame, a relax lead screw diagonally connected to the relax motor so as to rotate when the relax motor operates, and a relax carrier having one end penetrated by the relax lead screw through screw-coupling, the other end of the relax carrier being coupled to the pad portion of the headrest such that, when the relax lead screw rotates, the relax carrier moves diagonally along the relax lead screw.

When the relax lead screw is rotated by an operation of the relax motor, the relax carrier may move diagonally along the relax lead screw, and when the relax carrier moves, the pad portion of the headrest connected to the relax carrier may move diagonally with regard to the cover portion.

The relax driving module may further include multiple relax guides disposed diagonally in parallel to the relax lead screw, one end of each relax guide being fixed to the module base and installed to penetrate the relax carrier.

The relax driving module may further include a pair of left/right slider guides disposed diagonally in parallel to the relax lead screw, one end of each slider guide being fixed to the module base, and the other end thereof being fixed to a support portion of the main frame, and a pair of siders penetrated by the slider guides and configured to move diagonally along the slider guides, the sliders being coupled to the pad portion of the headrest so as to be spaced apart leftwards/rightwards.

The motor module portion may have an up/down motor configured to operate such that the headrest is moved upwards/downwards and has a relax motor configured to operate such that the pad portion of the headrest is moved diagonally, and the up/down motor and the relax motor may be both positioned on a front side with reference to the headrest stay and are installed to extend leftwards/rightwards.

A vehicle headrest device according to embodiments of the present disclosure is advantageous in that the entire headrest can move upwards/downwards, the pad portion of the headrest, which contacts the head of a sitting passenger, in particular, can move diagonally, and the passenger's head can thus be supported in an accurate position even if the support position is changed by a rotation of the seat back and depending on the passenger's body type, thereby ensuring a comfortable ride and alleviating neck injury in the case of an accident.

In addition, a vehicle headrest device according to embodiments of the present disclosure is advantageous in that, when the sitting passenger reclines the seat back to rest in a relax mode, the headrest is prevented from moving away from the passenger's head, and the headrest can thus support the passenger's head in a more accurate position, thereby ensuring that the passenger can rest in a more comfortable and relaxed manner.

In addition, a vehicle headrest device according to embodiments of the present disclosure is advantageous in that, even when the headrest is moved downwards to the lower limit because the sitting passenger is short, the headrest supports the upper end of the passenger's head, thereby preventing the passenger's neck from bending, and the range in which the passenger's head is supported can be increased, thereby improving comfortableness.

In addition, a vehicle headrest device according to embodiments of the present disclosure is advantageous in that the headrest can move upwards/downwards and diagonally so as to support the passenger's head accurately in the requested position such that the passenger can take various postures in a comfortable and relaxed manner.

BRIEF DESCRIPTION OF THE DRAWINGS

The above and other aspects, features, and advantages of embodiment of the present disclosure will be more apparent from the following detailed description taken in conjunction with the accompanying drawings, in which.

DETAILED DESCRIPTION OF ILLUSTRATIVE EMBODIMENTS

Figure 1:
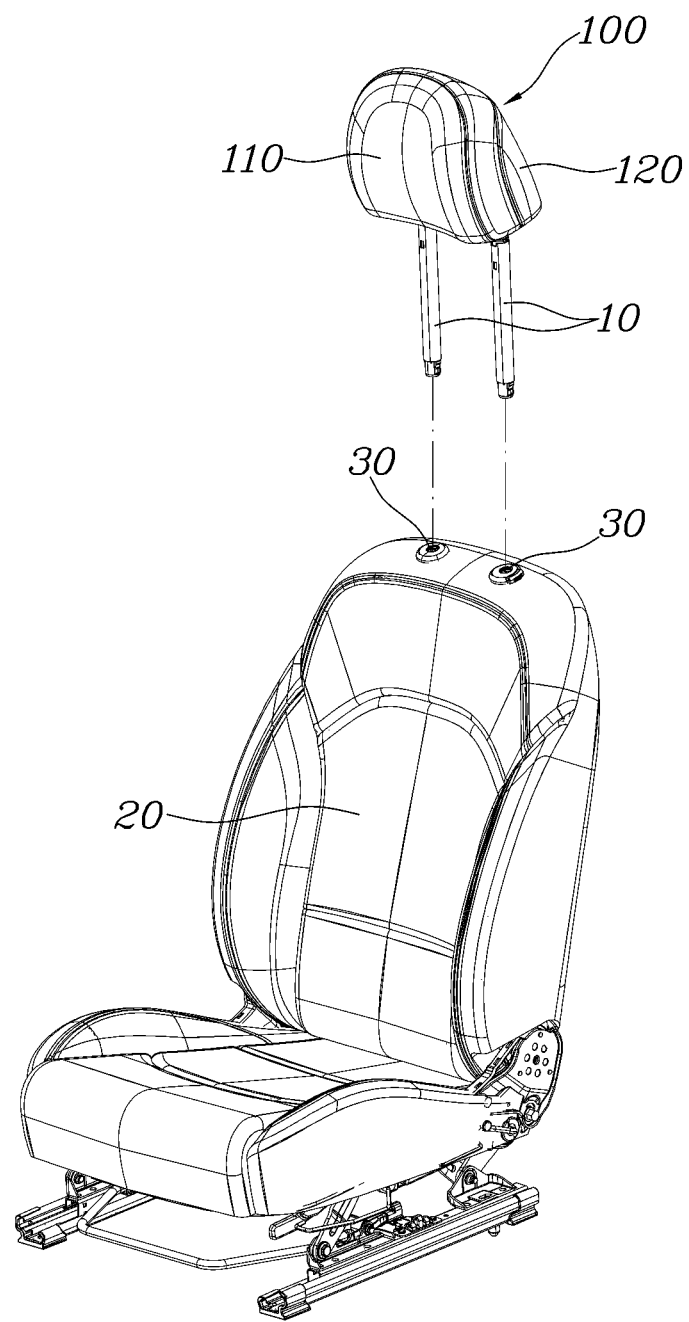
FIG. 1 illustrates a headrest device according to embodiments of the present disclosure, which is separated from a seat back.
Figure 2:
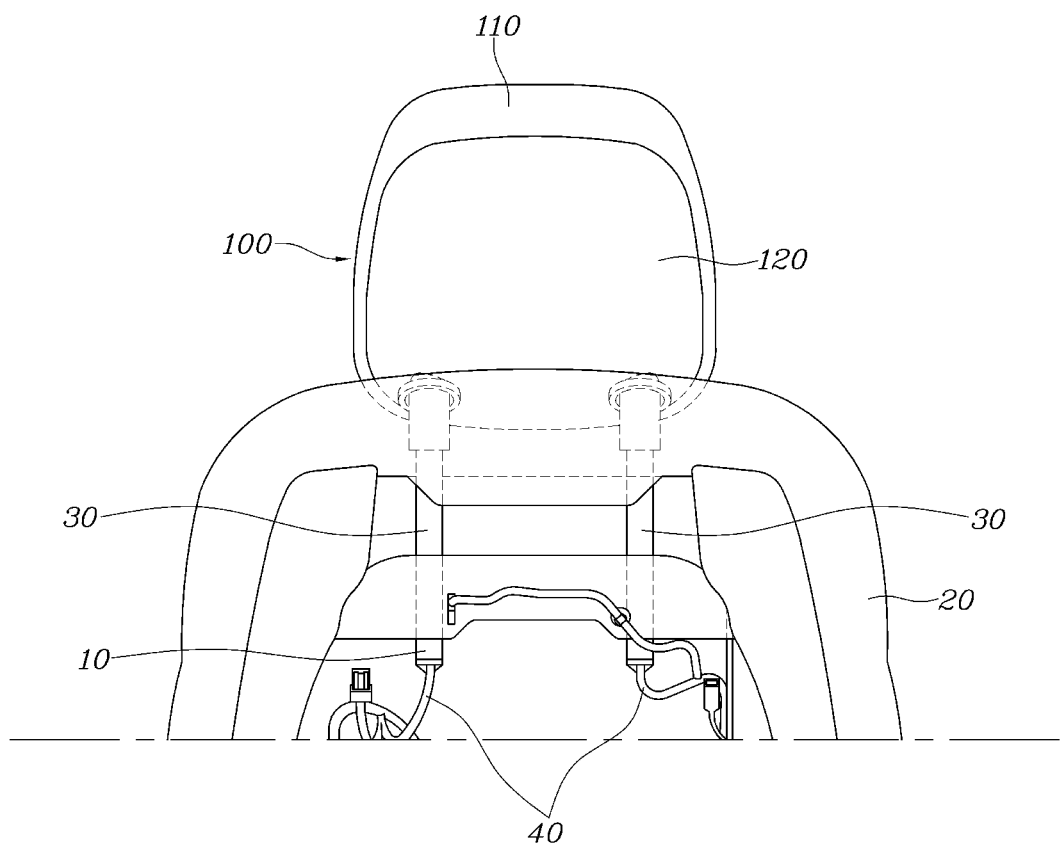
FIG. 2 is a rear view of the seat back in FIG. 1 in a coupled state.
Figure 3:
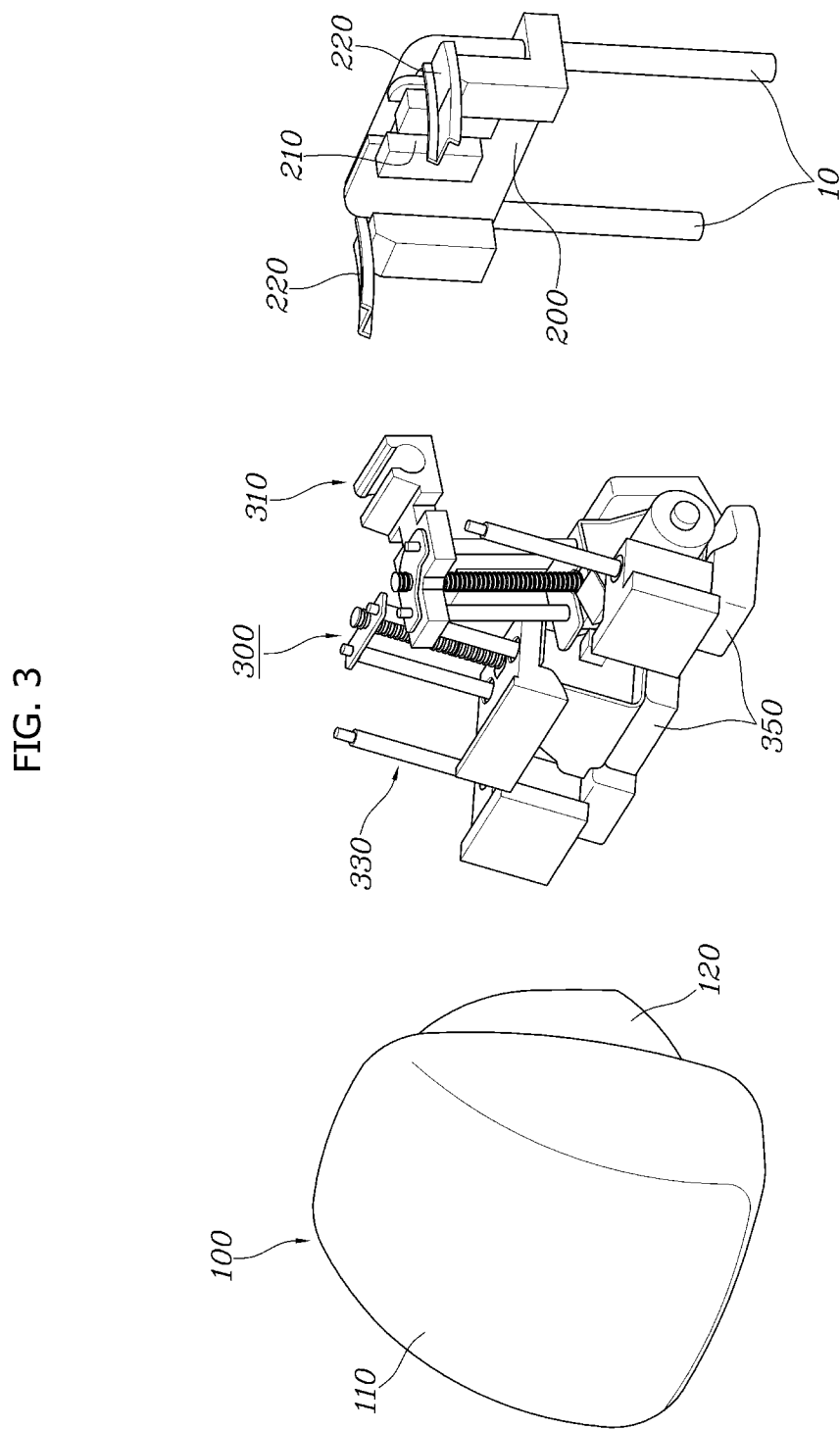
FIG. 3 is an exploded view of a headrest device according to embodiments of the present disclosure.

Hereinafter, embodiments disclosed in the present specification will be described in detail with reference to the accompanying drawings, and the same or similar elements are given the same or similar reference numerals, so duplicate descriptions thereof will be omitted.

The terms "module" and "unit" used for the elements in the following description are given or interchangeably used in consideration of only the ease of writing the specification and do not have distinct meanings or roles by themselves.

In describing the embodiments disclosed in the present specification, when the detailed description of the relevant known technology is determined to unnecessarily obscure the gist of the present disclosure, the detailed description may be omitted.

Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first," "second," or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element.

In contrast, in the case where an element is "directly connected" or "directly coupled" to any other element, it should be understood that no other element is present therebetween.

A singular expression may include a plural expression unless they are definitely different in a context.

As used herein, the expression "include" or "have" is intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit.

A controller may include a communication device configured to communicate with a sensor or another control unit, a memory configured to store an operation system, a logic command, or input/output information, and at least one processor configured to perform determination, calculation, decision or the like which are required for responsible function controlling.

Hereinafter, a vehicle headrest device according to exemplary embodiments of the present disclosure will be described with reference to the accompanying drawings.

The vehicle headrest device according to embodiments of the present disclosure is powered by a motor (electrically powered headrest). During motor driving, the entire headrest moves in the upward/downward direction, or the pad portion of the headrest, which supports a passenger's head, alone moves diagonally.

The motor operates in response to an electric current applied thereto under the control of a seat controller when the passenger sitting on the seat operates a button or a switch. The button or switch may be provided on the seat such that the passenger can easily manipulate the same.

As illustrated in FIG. 1 to FIG. 12, a vehicle headrest device according to embodiments of the present disclosure includes a headrest 100 including a pad portion no configured to contact and support the head of a passenger sitting on a seat and a cover portion 120 positioned behind the pad portion no, the pad portion no being configured to move diagonally, a main frame 200 coupled to headrest stays 10 so as to move upwards/downwards along the headrest stays 10, and a motor module portion 300 connected to the pad portion no and the main frame 200 such that, when operating, the motor module portion 300 moves the entire headrest 100, including the main frame 200, upwards/downwards, or moves the pad portion no alone diagonally.

The pad portion no of the headrest 100 includes a pad and a skin configured to contact and support a passenger's head while providing a cushion.

The cover portion 120 of the headrest 100 positioned behind the pad portion no is configured separately from the pad portion no and is made of a plastic material having a medium level of strength.

Figure 4:
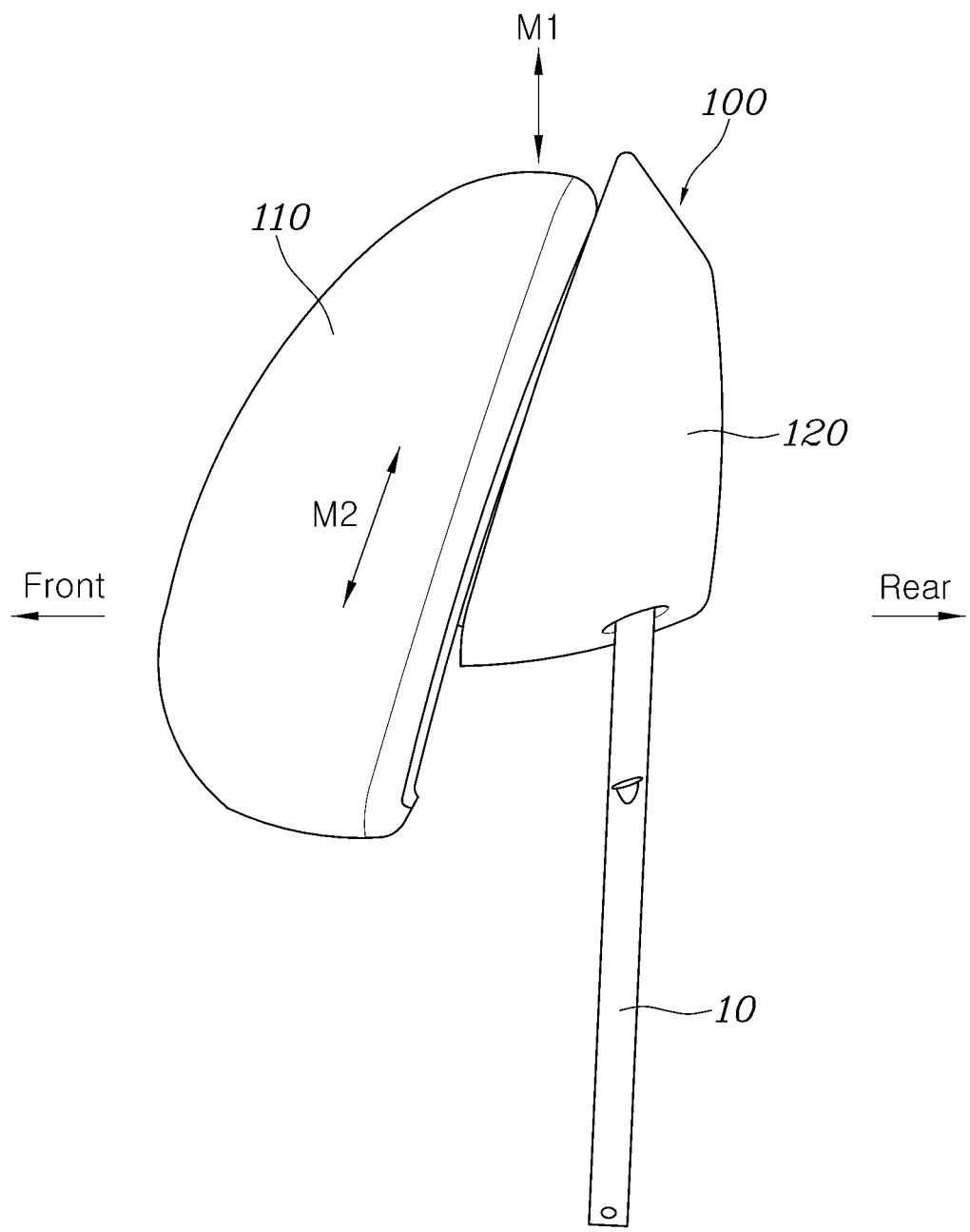
FIG. 4 is a side view of a headrest according to embodiments of the present disclosure.
Figure 5:
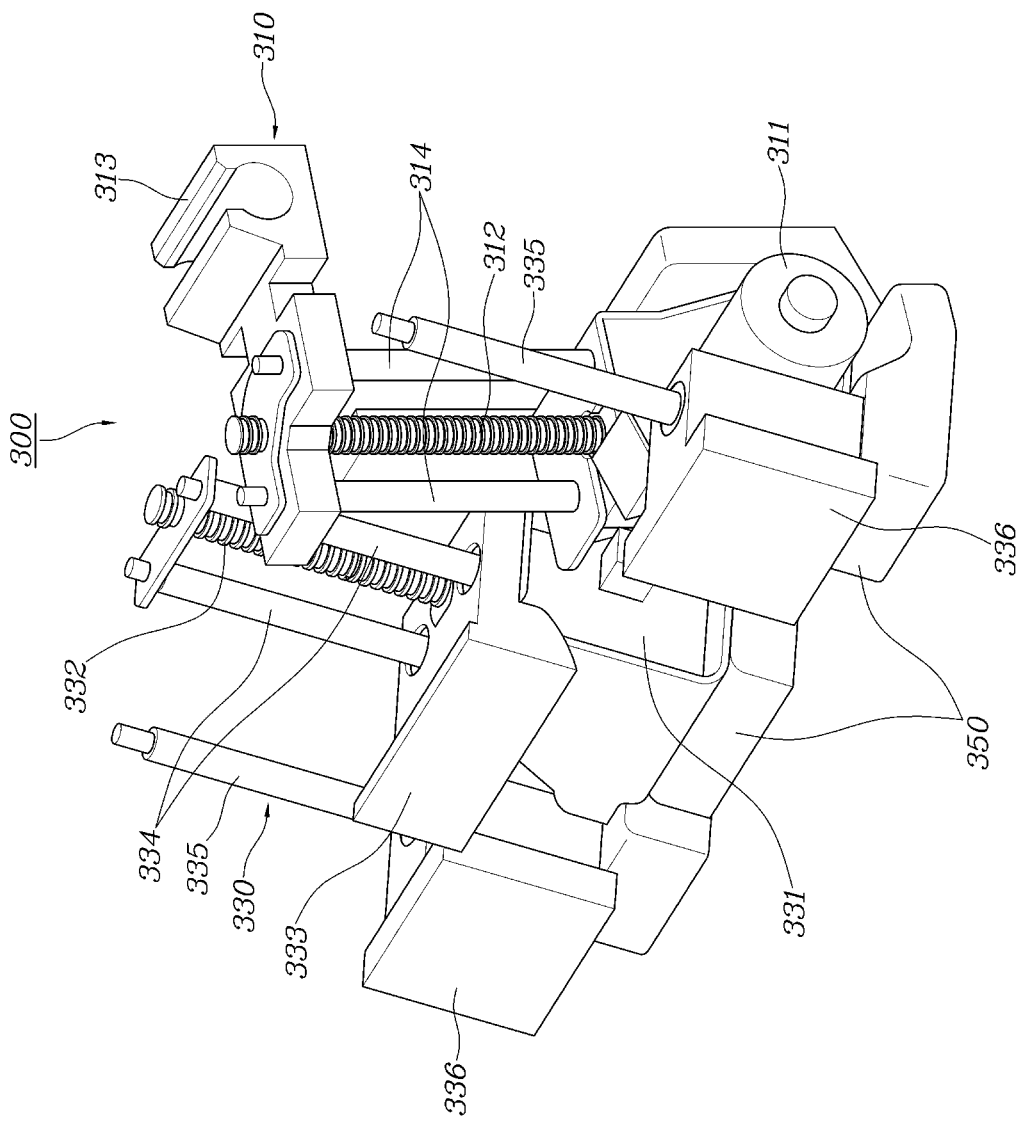
FIG. 5 illustrates a module driving portion according to embodiments of the present disclosure.
Figure 6:
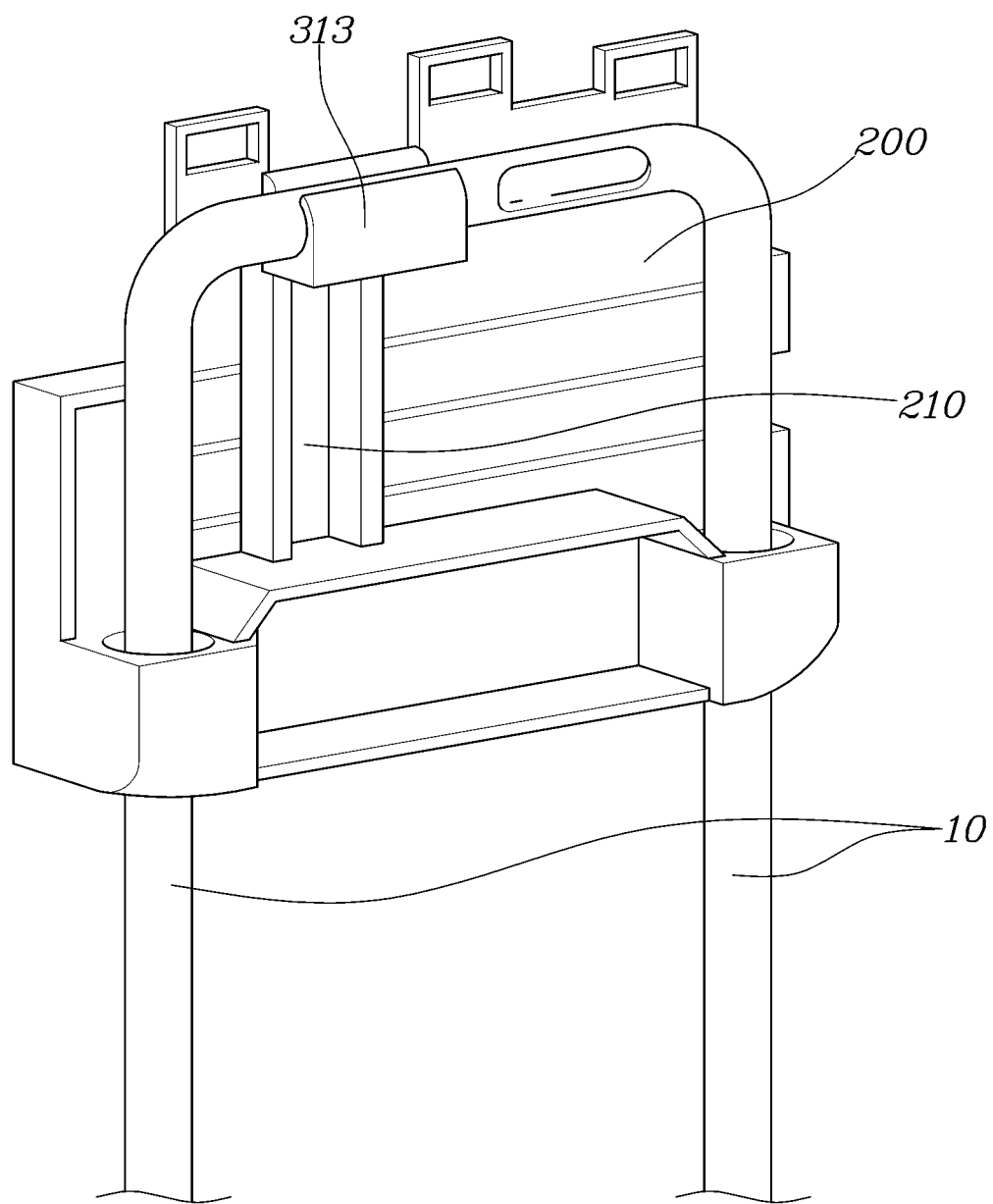
FIG. 6 is a rear view of headrest stays, to which a main frame and an up/down carrier are coupled.

When the entire headrest 100 moves upwards/downwards, the pad portion no and the cover portion 120 move together (arrow M1 in FIG. 4). When the pad portion no moves diagonally, the pad portion no alone moves diagonally with regard to the cover portion 120 (arrow M2 in FIG. 4).

The diagonal direction in which the pad portion no of the headrest 100 moves is an inclined direction from the upper rear side to the lower front side.

The cover portion 120 of the headrest 100 is coupled to the main frame 200 while surrounding the main frame 200 and the motor module portion 300. Accordingly, when the main frame 200 moves upwards/downwards with regard to the headrest stays 10, the cover portion 120 moves together.

A pair of stay guides 3o are installed on the upper end of the seat back 20 of the seat on which a passenger sits and are spaced apart leftwards/rightwards. Headrest stays 10 are fixedly installed through the stay guides 30.

The headrest stays 10 and the stay guides 3o are immobile (fixed components).

The motor module portion 300 includes an up/down motor and a relax motor (described later). Wires 4o are installed via the inner space of the headrest stays 10 so as to supply electric power to the up/down motor and the relax motor. Accordingly, the wires 4o are not exposed to the outside, thereby providing an improved appearance.

The wires 4o are installed via the inner space of the headrest stays 10 inside the seat back 20. One end of each wire 4o is connected to the up/down motor and the relax motor, which are parts of the motor module portion 300, and the other end thereof is connected to a connector inside the seat back 20 such that, when the passenger operates a button or a switch, electric power is supplied to the up/down motor and the relax motor.

The motor module portion 300 includes an up/down driving module 310 which, when operating, moves the entire headrest 100, including the main frame 200, upwards/downwards and a relax driving module 33o which, when operating, moves the pad portion 110 of the headrest 100 diagonally.

The up/down driving module 310 and the relax driving module 33o may constitute a single package module (motor module portion 300), thereby reducing the size, the number of components, and material costs.

The up/down driving module 310 includes an up/down motor 311 fixedly installed on a module base 35o connected to the main frame 200, an up/down lead screw 312 configured to rotate when the up/down motor 311 operates, an up/down carrier 313, one end of which is penetrated by the up/down lead screw 312 through screw coupling, and the other end of which is fixedly coupled to the headrest stay 10 through the main frame 200, and multiple up/down guides 314 disposed parallel to the up/down lead screw 312, one end of each multiple up/down guide 314 being fixed to the module base 35o, and the other end thereof being installed to penetrate the up/down carrier 313.

The up/down motor 311 is configured to be able to rotate both clockwise and counterclockwise (bidirectional motor).

The up/down carrier 313 is formed to extend forwards/backwards.

The up/down lead screw 312 penetrates the front end of the up/down carrier 313 in the upward/downward direction so as to be screw-coupled to the up/down carrier 313, and two up/down guides 314 penetrate the same next to the up/down lead screw 312.

The rear end of the up/down carrier 313 is formed in a yoke shape such that the same penetrates the main frame 200 and is fixedly coupled to the upper end of the headrest stay 10. Accordingly, the headrest stay 10 and the up/down carrier 313 are integrated and become immobile (fixed component).

Figure 7:
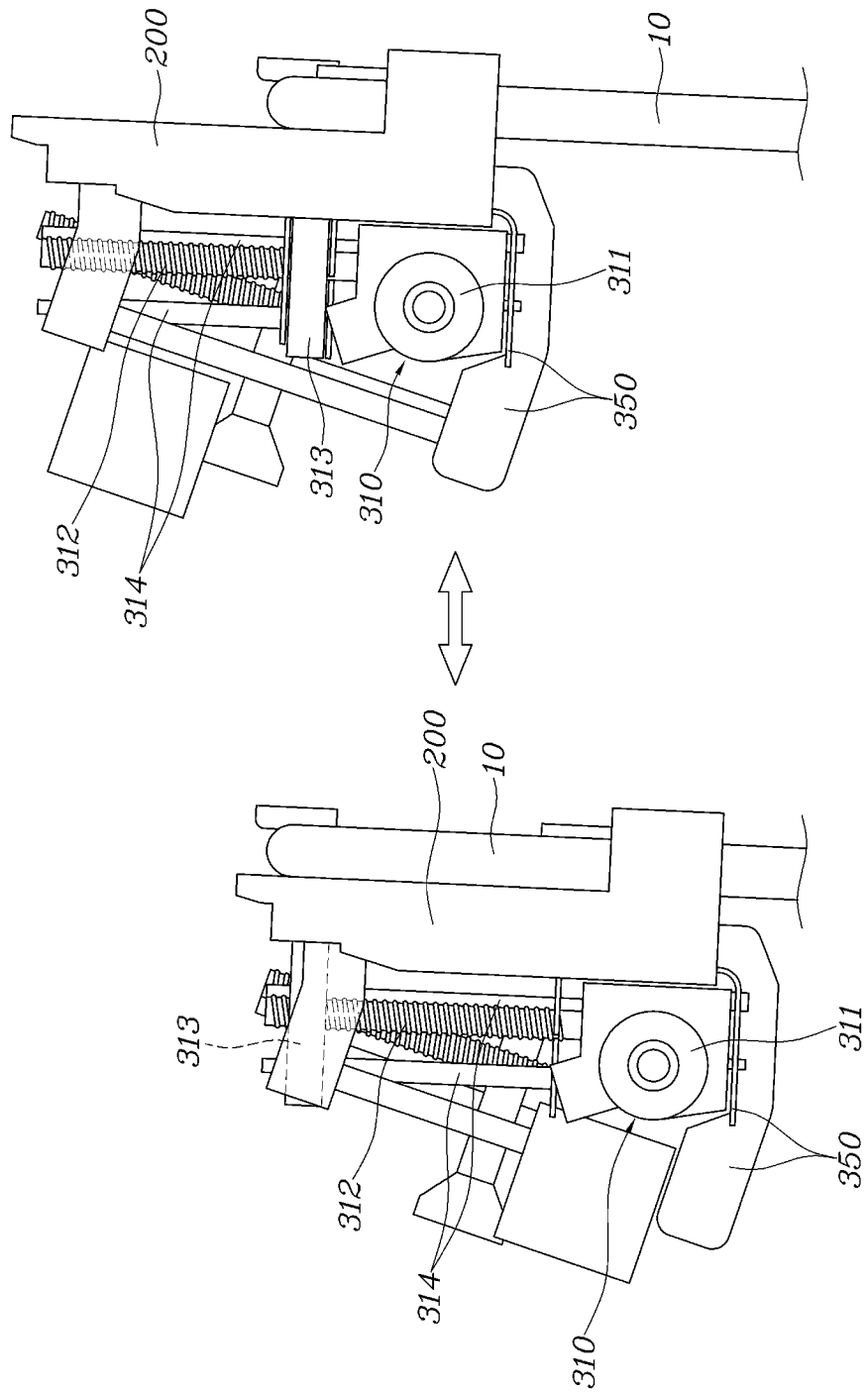
FIG. 7 to FIG. 9 illustrate operations of a headrest which move upwards/downwards as an up/down driving module operates according to embodiments of the present disclosure.
Figure 8:
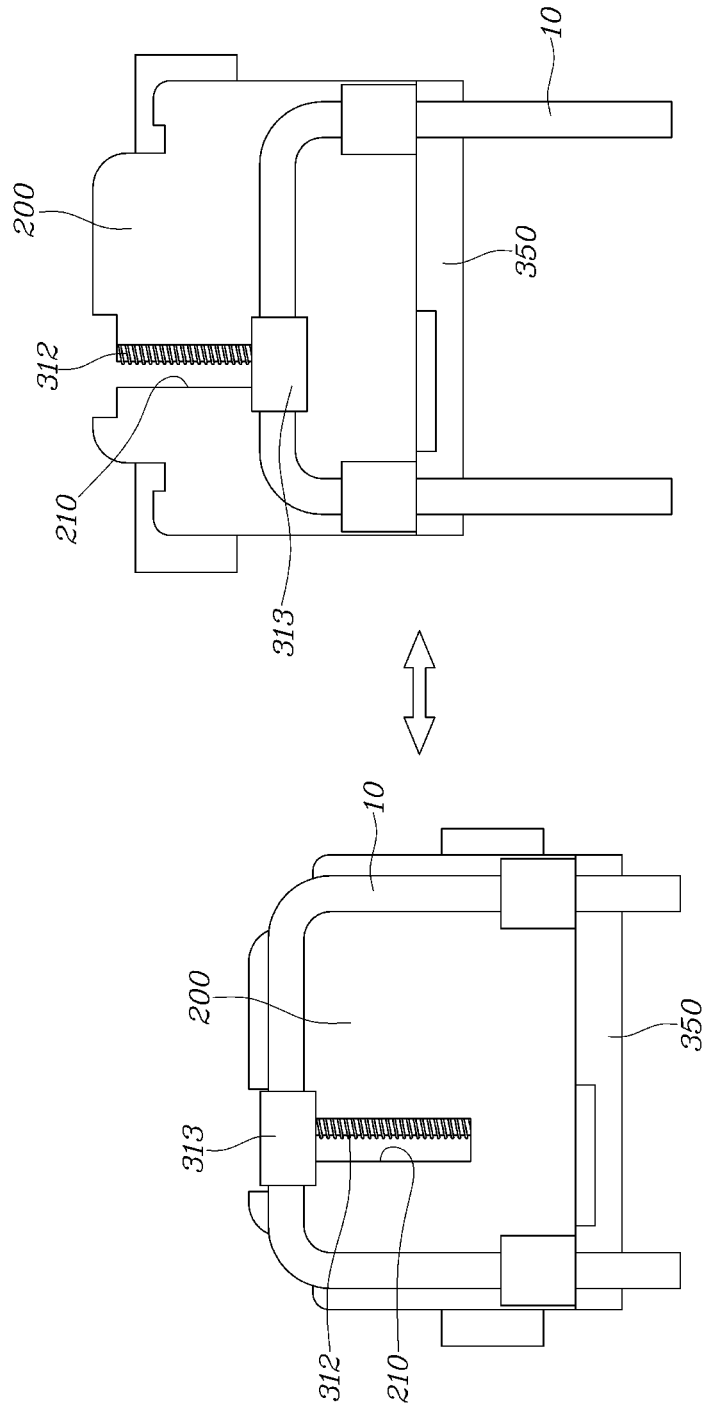
Figure 9:
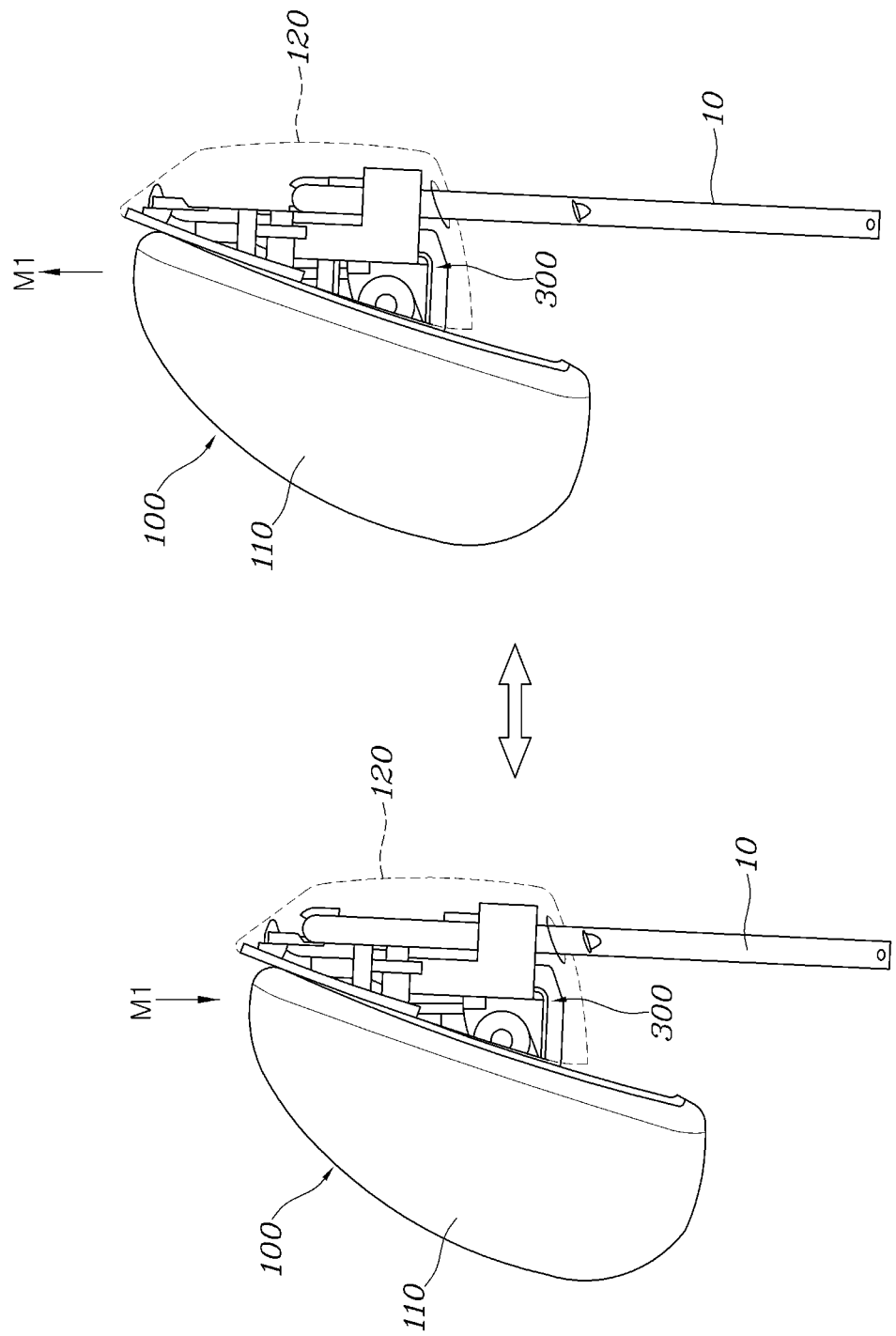

Therefore, if the up/down lead screw 312 is rotated by an operation of the up/down motor 311 as illustrated in FIG. 7 to FIG. 9, the fixed headrest stay 10 and the up/down carrier 313 cause the up/down lead screw 312 to move upwards/downwards through the up/down carrier 313. When the up/down lead screw 312 moves, the up/down motor 311 and the main frame 320 connected through the module base 35o move in the same upward/downward direction along the headrest stay 10. When the main frame 320 moves, the entire headrest 100 connected to the motor module portion 30o moves in the same upward/downward direction.

The main frame 200 has a carrier hole 210 formed such that the up/down carrier 313 penetrates the same in the forward/backward direction. The carrier hole 210 is formed to extend upwards/downwards such that, when the main frame 200 moves in the upward/downward direction, interference between the main frame 200 and the up/down carrier 313 is avoided, thereby facilitating upward/downward movement of the headrest 100.

The main frame 200 has a carrier hole 210 formed in an intermediate position in the leftward/rightward direction. The carrier hole 210 extends upwards/downwards so as to penetrate the main frame 200 in the forward/backward direction. The upper side of the carrier hole 210 is open to the upper end of the main frame 200. The lower end of the carrier hole 210 is closed by the main frame 200.

The relax driving module 33o includes a relax motor 331 fixedly installed on the module base 35o connected to the main frame 200, a relax lead screw 332 connected to the relax motor 331 diagonally so as to rotate when the relax motor 331 operates, a relax carrier 333, one end of which is penetrated by the relax lead screw 332 by screw-coupling, and the other end of which is coupled to the pad portion no of the headrest wo such that, when the relax lead screw 332 rotates, the relax carrier 333 moves diagonally along the relax lead screw 332, and multiple relax guides 334 disposed diagonally in parallel to the relax lead screw 332, one end of each relax guide 334 being fixed to the module base 35o, and the other end thereof penetrating the relax carrier 333.

The relax motor 331 is configured to be able to rotate both clockwise and counterclockwise (bidirectional motor).

The relax carrier 333 is formed to extend forwards/backwards.

The relax lead screw 332 penetrates the rear end of the relax carrier 313 in the upward/downward direction so as to be screw-coupled to the relax carrier 333, and two relax guides 334 penetrate the same next to the relax lead screw 332.

The front end of the relax carrier 333 is coupled to the pad portion no of the headrest 100 and is integrated with the pad portion no. Accordingly, when the relax carrier 333 moves diagonally along the longitudinal direction of the relax lead screw 332, the pad portion no of the headrest wo moves diagonally together.

The relax driving module 33o further includes a pair of left/right slider guides 335 disposed diagonally in parallel to the relax lead screw 332, one end of each slider guide 335 being fixed to the module base 35o, and the other end thereof being fixed to a support portion 220 of the main frame 200, and a pair of sliders 336 penetrated by the slider guides 335, the sliders 336 moving diagonally along the slider guides 335 and being coupled to the pad portion no of the headrest 100 while being spaced apart leftwards/rightwards.

Two slider guides 335 are disposed diagonally in parallel to the relax lead screw 332 and are installed on the left and right sides of the module base 35o, respectively.

Lower ends of the slider guides 335 are fixed to the left and right sides of the module base 35o, respectively, and upper ends thereof are fixed to support portions 220 provided on the main frame 200, respectively.

The support portions 220 are provided on the left and right sides of the upper end of the main frame 200 so as to protrude forwards, respectively.

The sliders 336 are formed to extend forwards/backwards.

Rear ends of the sliders 336 are penetrated by the slider guides 335 in the upward/downward direction, and front ends of the sliders 336 are coupled to the pad portion no of the headrest wo to be integrated with the pad portion no.

The two sliders 336 coupled to the left and right portions of the pad portion 110 ensure that the pad portion 110 is firmly coupled and can move diagonally in a more stable state, in particular.

Figure 10:
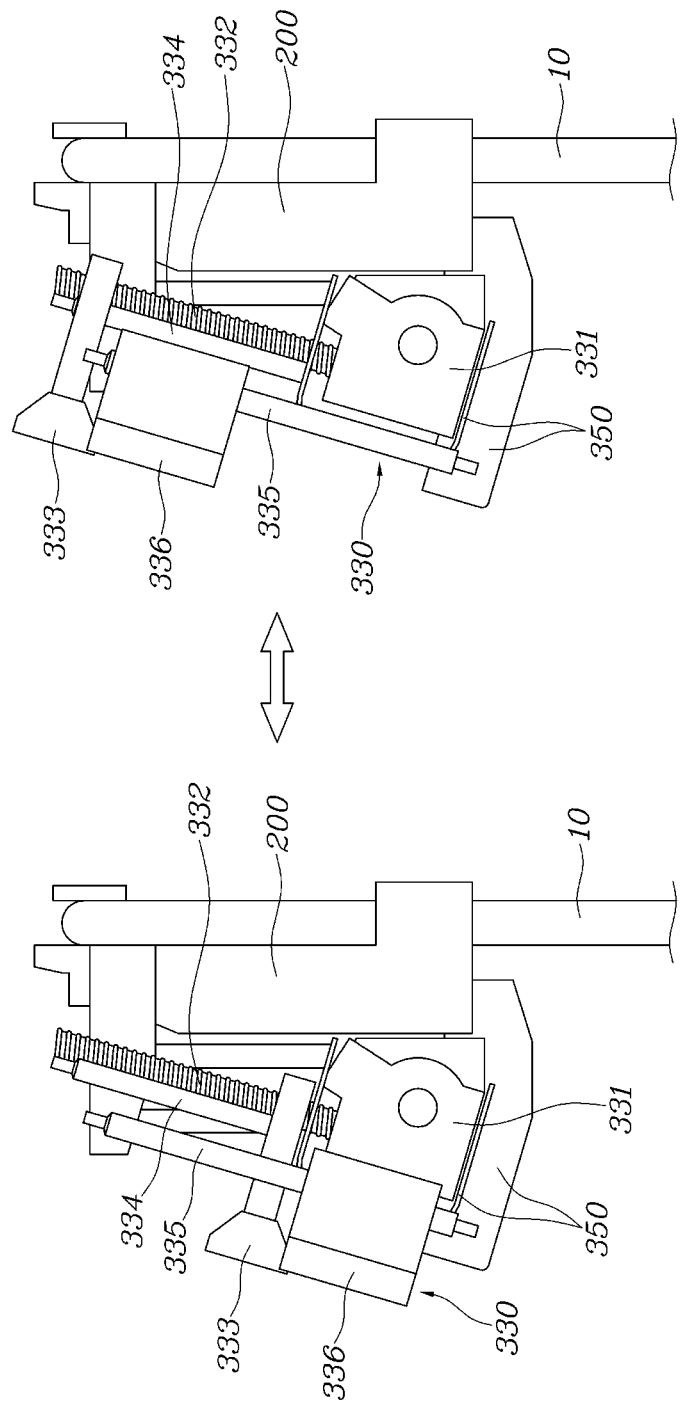
FIG. 10 to FIG. 12 illustrate operations of a pad portion of a headrest, which moves diagonally as a relax driving module operates according to embodiments of the present disclosure.
Figure 11:
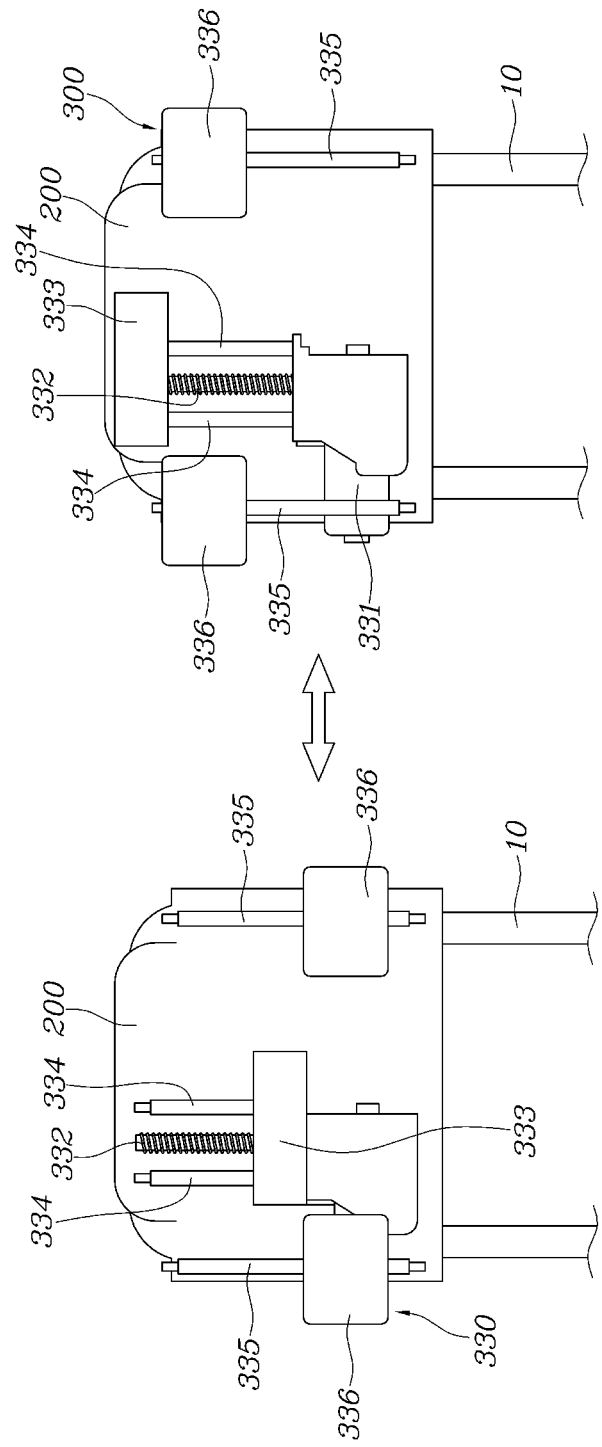
Figure 12:
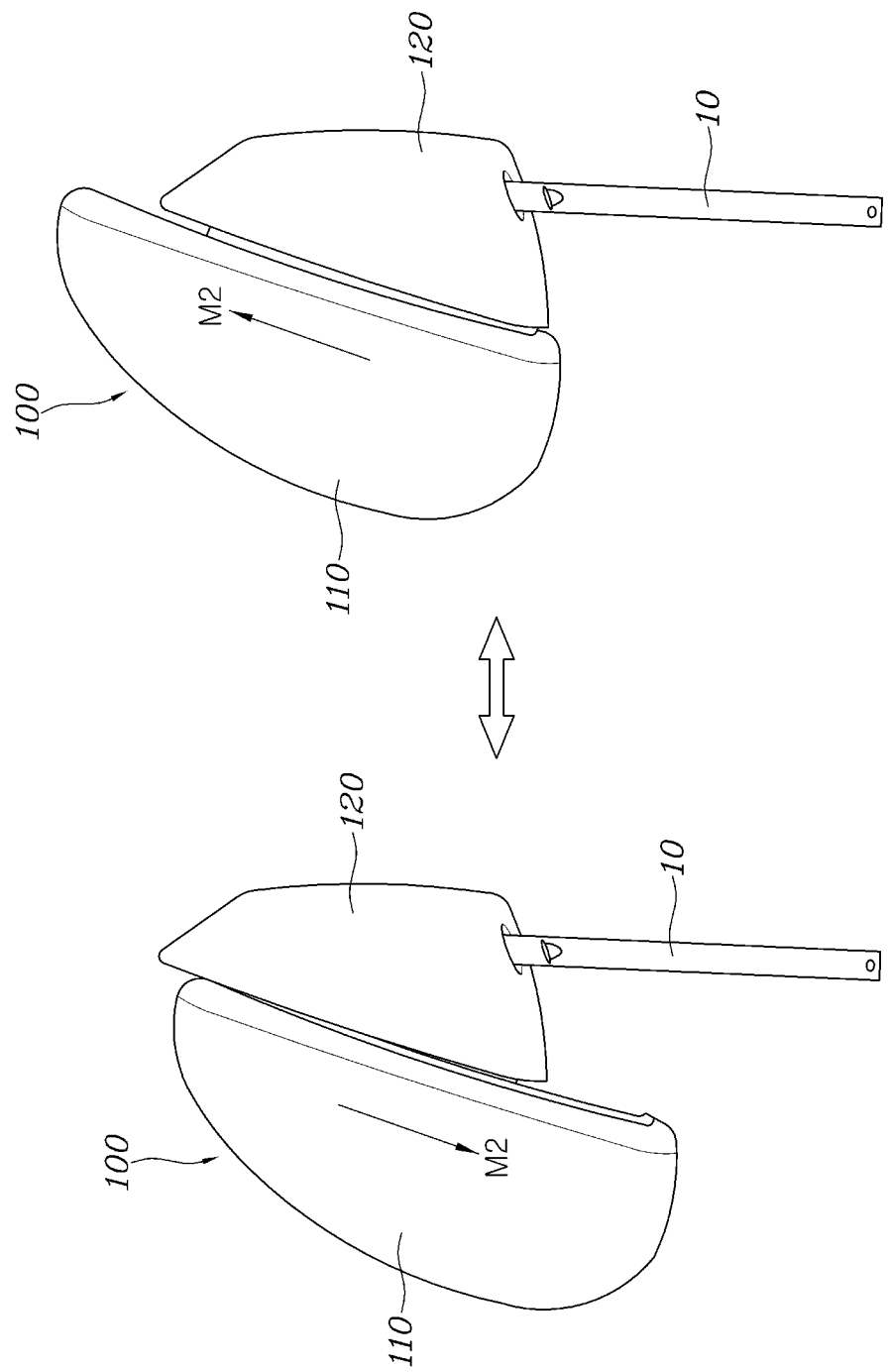

Therefore, if the relax lead screw 332 is rotated by an operation of the relax motor 331 as illustrated in FIG. 10 to FIG. 12, the relax carrier 333 moves diagonally along the relax lead screw 332, and the sliders 336 move diagonally along the slider guides 335 as well. When the relax carrier 333 and the sliders 336 move, the pad portion 110 of the headrest 100 connected to the relax carrier 333 and the sliders 336 move diagonally with regard to the cover portion 120.

In an embodiment of the present disclosure, the up/down motor 311 which operates to move the headrest 100 in the upward/downward direction and the relax motor 331 which operates to move the pad portion 110 of the headrest 100 diagonally are both positioned on the front side with reference to the headrest stay 10 and are installed to extend leftwards/rightwards. This structure may reduce the overall size of the modularized configuration.

As described above, a vehicle headrest device according to embodiments of the present disclosure is advantageous in that the entire headrest 100 can move upwards/downwards, the pad portion 110 of the headrest 100, which contacts the head of a sitting passenger, in particular, can move diagonally, and the passenger's head can thus be supported in an accurate position even if the support position is changed by a rotation of the seat back 20 and depending on the passenger's body type, thereby ensuring a comfortable ride and alleviating neck injury in the case of an accident.

In addition, a vehicle headrest device according to embodiments of the present disclosure is advantageous in that, when the sitting passenger reclines the seat back 20 to rest in a relax mode, the headrest 100 is prevented from moving away from the passenger's head, and the headrest 100 can thus support the passenger's head in a more accurate position, thereby ensuring that the passenger can rest in a more comfortable and relaxed manner.

In addition, a vehicle headrest device according to embodiments of the present disclosure is advantageous in that, even when the headrest wo is moved downwards to the lower limit because the sitting passenger is short, the headrest 100 supports the upper end of the passenger's head, thereby preventing the passenger's neck from bending, and the range in which the passenger's head is supported can be increased, thereby improving comfortableness.

In addition, a vehicle headrest device according to embodiments of the present disclosure is advantageous in that the headrest wo can move upwards/downwards and diagonally so as to support the passenger's head accurately in the requested position such that the passenger can take various postures in a comfortable and relaxed manner.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A vehicle headrest device for a head of a passenger, the vehicle headrest device comprising:
    a headrest comprising:
        a pad portion configured to contact and support the head of the passenger; and
        a cover portion positioned behind the pad portion,
        wherein the pad portion is configured to move along an imaginary straight line inclined forward with respect to the cover portion of the headrest;
    a main frame coupled to a headrest stay and configured to move upwards/downwards along the headrest stay; and
    a motor module portion connected to the pad portion and the main frame such that, in operation, the motor module portion is configured to:
        move an entirety of the headrest, including the main frame and the cover portion, in an upwards/downwards direction; or
        move only the pad portion along the imaginary straight line.

2. The vehicle headrest device of claim 1, wherein the pad portion is configured to move in a direction along the imaginary straight line, the direction being an inclined direction from an upper rear side to a lower front side of the headrest.

3. The vehicle headrest device of claim 1, wherein the cover portion is coupled to the main frame while surrounding the main frame and the motor module portion.

4. The vehicle headrest device of claim 1, wherein the headrest stay is fixedly installed and configured to penetrate a stay guide coupled to an upper end of a seat back.

5. The vehicle headrest device of claim 1, further comprising a wire installed via an inner space of the headrest stay and configured to supply electric power to the motor module portion.

6. The vehicle headrest device of claim 1, wherein the motor module portion comprises an up/down driving module configured such that, in operation, the up/down driving module is configured to move the entirety of the headrest, including the main frame, in the upwards/downwards direction.

7. The vehicle headrest device of claim 6, wherein the up/down driving module comprises:
   an up/down motor fixedly installed on a module base connected to the main frame;
   an up/down lead screw configured to rotate during operation of the up/down motor; and
   an up/down carrier having a first end penetrated by the up/down lead screw through screw coupling and a second end fixedly coupled to the headrest stay through the main frame.

8. The vehicle headrest device of claim 7, wherein, during an operation in which the up/down lead screw is rotated by an operation of the up/down motor, the up/down lead screw is configured to move in the upwards/downwards direction through the up/down carrier via the headrest stay and the up/down carrier which are fixed.

9. The vehicle headrest device of claim 7, wherein, during an operation in which the up/down lead screw moves, the up/down motor and the main frame connected through the module base are configured to move along the headrest stay in the upwards/downwards direction.

10. The vehicle headrest device of claim 7, wherein, during an operation in which the main frame moves, the headrest connected to the motor module portion is configured to move in the upwards/downwards direction.

11. The vehicle headrest device of claim 7, wherein the main frame has a carrier hole configured to be penetrated by the up/down carrier, and the carrier hole extends in the upwards/downwards direction such that, in a situation in which the main frame moves in the upwards/downwards direction, interference between the main frame and the up/down carrier is avoided.

12. The vehicle headrest device of claim 7, wherein the up/down driving module further comprises multiple up/down guides disposed parallel to the up/down lead screw, and wherein a first end of each of the multiple up/down guides is fixed to the module base and a second end thereof is installed to penetrate the up/down carrier.

13. The vehicle headrest device of claim 1, wherein:
   the motor module portion comprises:
      an up/down motor configured to operate such that the headrest is moved in the upwards/downwards direction; and
      a relax motor configured to operate such that the pad portion of the headrest is moved along the imaginary straight line, and
   the up/down motor and the relax motor are both positioned on a front side with reference to the headrest stay and are installed to extend leftwards/rightward.

14. A vehicle headrest device for a head of a passenger, the vehicle headrest device comprising:
   a headrest comprising:
      a pad portion configured to contact and support the head of the passenger; and
      a cover portion positioned behind the pad portion,
      wherein the pad portion is configured to move along an imaginary straight line inclined forward with respect to the cover portion of the headrest;
   a main frame coupled to a headrest stay and configured to move in an upwards/downwards direction along the headrest stay; and
   a motor module portion connected to the pad portion and the main frame such that, in operation, the motor module portion is configured to:
      move an entirety of the headrest, including the main frame and the cover portion, in the upwards/downwards direction; or
      move only the pad portion along the imaginary straight line,
   wherein:
      the motor module portion comprises a relax driving module configured to move the pad portion of the headrest along the imaginary straight line when the relax driving module operates, and
      the relax driving module comprises:
         a relax motor fixedly installed on a module base connected to the main frame;
         a relax lead screw connected to the relax motor and configured to rotate when the relax motor operates, wherein the relax lead screw is oriented at an angle offset from the upwards/downwards direction and parallel to the imaginary straight line; and
         a relax carrier having a first end penetrated by the relax lead screw through screw-coupling and a second end coupled to the pad portion of the headrest such that, during rotation of the relax lead screw, the relax carrier is configured to move along the relax lead screw and parallel to the imaginary straight line.

15. The vehicle headrest device of claim 14, wherein, when the relax lead screw is rotated by an operation of the relax motor, the relax carrier is configured to move along the relax lead screw.

16. The vehicle headrest device of claim 15, wherein, when the relax carrier moves, the pad portion of the headrest connected to the relax carrier is configured to move along the imaginary straight line.

17. The vehicle headrest device of claim 14, wherein:
   the relax driving module further comprises multiple relax guides disposed in parallel with the relax lead screw, and
   a first end of each of the relax guides is fixed to the module base and installed to penetrate the relax carrier.

18. The vehicle headrest device of claim 14, wherein the relax driving module further comprises:
   a pair of left/right slider guides disposed in parallel with the relax lead screw, wherein:
      a first end of each of the left/right slider guides is fixed to the module base, and
      a second end of each of the left/right slider guides is fixed to a support portion of the main frame; and
   a pair of sliders penetrated by the slider guides and configured to move along the slider guides, wherein each of the pair of sliders is coupled to the pad portion of the headrest so as to be spaced apart in a leftwards/rightwards direction.

19. A vehicle including a headrest for a head of a passenger, the vehicle comprising:
- a vehicle body;
- a passenger seat in an interior of the vehicle body, the passenger seat comprising:
  - a seat cushion configured to support a lower body of the passenger;
  - a seat back configured to support an upper body of the passenger; and
  - the headrest comprising:
    - a pad portion configured to contact and support the head of the passenger; and
    - a cover portion positioned behind the pad portion,
    - wherein the pad portion being is configured to move along an imaginary straight line inclined forward with respect to the cover portion of the headrest;
  - a stay guide coupled to an upper end of the seat back;
  - a headrest stay fixedly installed and configured to penetrate the stay guide;
  - a main frame coupled to the headrest stay and configured to move in an upwards/downwards direction along the headrest stay; and
  - a motor module portion connected to the pad portion and the main frame such that, in operation, the motor module portion is configured to:
    - move an entirety of the headrest, including the main frame and the cover portion, in the upwards/downwards direction; or
    - move only the pad portion along the imaginary straight line.

20. The vehicle of claim 19, wherein the pad portion is configured to move in a direction along the imaginary straight line, the direction being an inclined direction from an upper rear side to a lower front side of the headrest.

* * * * *